United States Patent
Schramm et al.

[15] 3,673,175
[45] June 27, 1972

[54] PREPARATION OF PIPERIDYL-STEROIDS

[72] Inventors: Geza Schramm; Horst Riedl, both of Linz, Donau, Austria

[73] Assignee: Osterreichische Stickstoffwerke Aktiengesellschaft, Linz, Donau, Austria

[22] Filed: April 26, 1971

[21] Appl. No.: 137,699

[30] Foreign Application Priority Data

April 24, 1970 Austria ..............................A 3750/70

[52] U.S. Cl. ..........................................................260/239.5
[51] Int. Cl. ........................................................C07c 173/10
[58] Field of Search................................................260/239.5

[56] References Cited

UNITED STATES PATENTS 2,886,564  5/1959  Holysz ................................260/239.5
3,017,408  1/1962  Kerwin ..............................260/239.5

Primary Examiner—Elbert L. Roberts
Attorney—Wenderoth, Lind & Ponack

[57] ABSTRACT

The preparation of piperidyl-steroids having an oxygen-containing group in the 16-position which comprises reacting $C_{16}$-bromo-cyanamides, in a predominantly aprotic and polar medium with an alkali metal salt of a lower aliphatic carboxylic acid or of benzoic acid, isolating the resulting 16-acyloxy-cyanamide and then reducing this compound to remove the nitrile group.

7 Claims, No Drawings

PREPARATION OF PIPERIDYL-STEROIDS

The present invention relates to a process for the preparation of piperidyl-steroids and more particularly to the preparation of piperidyl-steroids having an oxygen-containing group in the 16-position.

In the course of experiments to degrade the solanidane skeleton to give pharmaceutically valuable, nitrogen-free steroids, it has proved possible to open the ring E in solanidine, demissidine and the 3-acyl derivatives thereof by degradation with cyanogen bromide according to J. v. Braun (see J.A. Beisler and Y. Sato, Chemical Communications, 1968, 963 and 964).

The resulting 16-bromo-cyanamides of the formula:

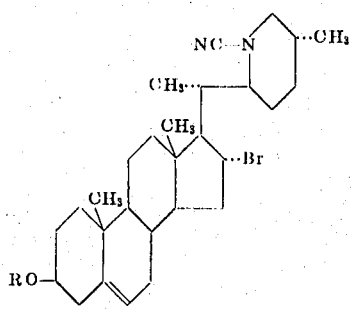

wherein R is a hydrogen atom of an acetyl radical, (the configuration of the bromine in position 16 was left unsettled in the investigation mentioned, but according to our own investigations is in the α-position), or the 5α,6-dihydro derivatives thereof, were then reduced with lithium aluminum hydride, whereby the corresponding known piperidyl-steroids which are dehalogenated in the 16-position are obtained only in yields of less than 50 percent, together with 25 to 35 percent of demissidine or solanidine re-formed by cyclisation, and an unidentified product. Hence the further degradation, which, for example, is conceivable by ultra-violet decomposition in the presence of acids, analogously to the known degradation of spirosolane alkaloids (East German Pat. Specification No. 33,214) has encountered difficulties, since the separation of the mixture is difficult and entails high losses, apart from the fact that the yield of piperidyl-steroid would in any case not be satisfactory.

It has now been discovered that the α-bromine atom in the 16-position may be converted into a β-acyloxy group, with inversion occurring, if the known 16α-bromo derivative is reacted with an alkali metal salt of a lower aliphatic carboxylic acid or benzoic acid, and that the 16β-acyloxy-cyanamide which thereby results may be reduced in practically quantitative yield to a 16β-acyloxy or hydroxypiperidyl-steroid, which is already known and belongs to the dihydrotomatidine-B series (configuration 22R and 25 S). These known compounds can, according to K. Schreiber, Annalen 666, 155 (1963), be converted by N-chlorination and alkaline elimination of hydrochloric acid into spirosolane alkaloids of the tomatidine series, which can be degraded to N-free pregnane derivatives according to analogous methods to those known for spirostanes. For this degradation, yields of 60 to 75 percent are quoted in the tomatidine series (K. Schreiber in R.H.F. Manske; The Alkaloids X, 1968, 106 and 109). This also for the first time provides an industrially workable method of starting from solanidane alkaloids and arriving at known pregnane derivatives, such as 3β-acetoxy-5α-pregn-16-en-20-one or 3β-acetoxy-pregna-5,16-dien-20-one, which represent customary intermediate products in the synthesis of pharmaceutically suitable pregnane derivatives. The 16β-hydroxypiperidyl-steroids thereby obtainable equally lend themselves to a degradation analogous to that disclosed in East German Pat. Specification No. 33,214, which leads to 20-chloropregnanes.

In accordance with the present invention there is provided a process for the preparation of a piperidyl-steroid which has an oxygen-containing group in the 16-position, and having the general formula:

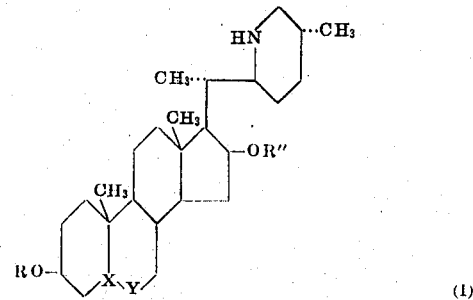

in which X–Y denotes the group

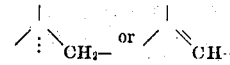

and R is a hydrogen atom or a radical of an aliphatic or aromatic carboxylic acid, and R" is a hydrogen atom or an acyl group of a lower aliphatic carboxylic acid or a benzoyl group, which comprises reacting a $C_{16}$-bromo-cyanamide having the general formula:

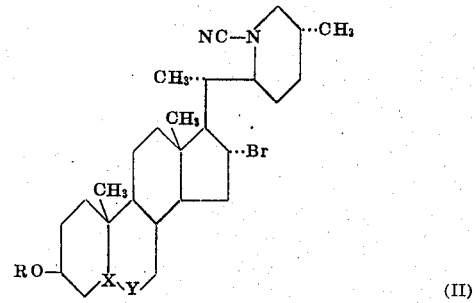

in which R and X–Y are as defined above in a medium which is at least predominantly aprotic and polar, with an alkali metal salt of a lower aliphatic carboxylic acid or of benzoic acid, and after isolation of the resulting 16-acyloxy-cyanamide of the general formula:

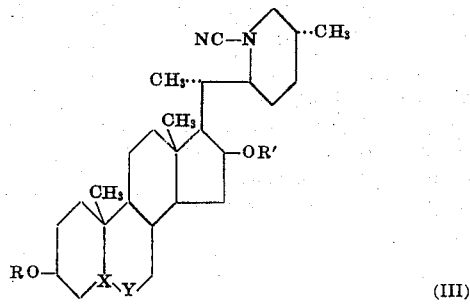

in which R' is an acyl group of a lower aliphatic carboxylic acid or a benzoyl group, and R and X–Y are as defined above, reducing this compound of Formula (III) with nascent hydrogen, or in alkaline solution with a complex hydride of aluminium or an alanate, to remove the nitrile group.

The aprotic, polar medium for the reaction with the alkali metal salt is achieved if the process is carried out in an aprotic, polar solvent for the compounds of the Formula II. Dimethylformamide, dimethylsulphoxide, acetonitrile or hexamethylphosphoric acid tris-amide for example, may be mentioned as such solvents. The alkali metal salt, preferably potassium acetate or sodium acetate, may be added to the reaction mixture either in the solid form or in the form of an aqueous solution which is in itself preferred. This solution must, however, be as concentrated as possible, in order to maintain the predominantly aprotic character of the reaction medium. Apart from alkali metal acetates, alkali metal propionates, alkali metal butyrates or alkali metal benzoates are also suitable.

The reaction will take place at room temperature. However, in order to accelerate the reaction, a reaction temperature within the range of 80° to 150° C. appropriately may be chosen. At temperatures above 150° C., the reaction in principle will also take place, but the purity of the reaction product of the Formula III suffers thereby.

After completion of the reaction, the reaction product of the Formula III must be isolated before it can be subjected to reduction. This isolation is either achievable by extraction with a suitable solvent, for example benzene, and subsequent evaporation, or by pouring the reaction mixture into water, whereupon the compound of Formula III separates out as a solid precipitate and may be isolated by filtration or suction-filtration. It may be of advantage for the purity of the end product to recrystallize the compound of the Formula III once, before processing it further.

The subsequent reduction of the cyanamide group is achievable with customary non-catalytic reaction methods, such as reduction with nascent hydrogen, evolved from acid and metal, or reduction with a complex hydride of aluminium, such as, for example, lithium aluminium hydride, sodium aluminium hydride or sodium dihydro-bis(2-methoxy-ethoxy)-alanate. If a reduction method employing nascent hydrogen, for example zinc and glacial acetic acid, is chosen, the acyl group on the O-atom in position 16 remains preserved, as do acyl groups on the O-atom in position 3, for example acetyl or benzoyl groups, if these are present. On reduction with the complex hydride of aluminium, which is carried out in an alkaline medium, the hydroxyl group is liberated both in the 16-position and in the 3-position.

In contrast to the reduction of the corresponding 16-Br derivatives, the present reduction takes place smoothly and in almost quantitative yield. The piperidyl-steroids of the Formula I are obtained as colorless, crystalline, homogeneous products immediately after the customary working up of the reaction mixture by separating off, or decomposing, excess reducing agent and separating off inorganic constituents which are present.

The process according to the invention is illustrated in the following examples.

EXAMPLE 1

20 ml. of a 40 percent strength potassium acetate solution is added at 90° C. to a solution of 6 g. of 3$\beta$-acetoxy-20(S)-[1'-cyano-5'(S)-methylpiperidyl-2'(R)]-16$\alpha$-bromo-5$\alpha$-pregnane in 600 ml. of dimethylformamide. The reaction mixture is allowed to react for 45 minutes at 90° C. and is then poured into 4 l. of water, whereupon 3$\beta$,16$\beta$-diacetoxy-20(S)-[1'-cyano-5'(S)-methylpiperidyl-2'(R)]-5$\alpha$-pregnane is obtained as a flocculent, finely crystalline precipitate in almost quantitative yield.

After two recrystallizations from cyclohexane, a product which according to thin layer chromatography is a single substance is obtained.
Melting point:
160° to 167° C., $[\alpha]_D^{24} = +28.0°$ (chloroform)
Calculated:
C 72.96 percent, H 9.57 percent, N 5.32 percent, O 12.15 percent
Found:
C 72.7 percent, H 9.7 percent, N 5.2 percent, O 12.3 percent A solution of 1 g. of the 3$\beta$,16$\beta$-diacetoxy-20(S)-[1'-cyano-5'(S)-methylpiperidyl-2'(R)]-5$\alpha$-pregnane thus obtained in 100 ml of absolute benzene is slowly added dropwise to a boiling solution of 4.8 ml. of a 70 percent strength benzene solution of sodium dihydro-bis(2-methoxy ethoxy)-alanate in 100 ml. of absolute benzene. The reaction is allowed to continue for 90 minutes at the boiling point of the solvent, the mixture is cooled, excess reducing agent is decomposed with 30 ml. of 30 percent strength sodium hydroxide solution, and the phases are separated. The aqueous phase is once more extracted with benzene. The benzene phases are combined, washed until free of alkali, dried and evaporated to dryness in vacuo. 20 (S)-[5'(S)-methyl-piperidyl-2'(R)]-5$\alpha$-pregnane-3$\beta$,16$\beta$-diol is obtained in 88.3 percent yield as a colorless solid residue. After recrystallization from benzene it shows the following data:
Melting point:
234° to 238° C, $[\alpha]_D^{23} = +11.4°$ (methanol)
Calculated:
C 77.64 percent, H 11.34 percent, N 3.35 percent, O 7.66 percent
Found:
C 77.5 percent, H 11.3 percent, N 3.3 percent, O 8.0 percent

EXAMPLE 2

20 ml. of a 40 percent strength potassium acetate solution is added to a solution of 6 g. of 3$\beta$-acetoxy-20(S)-[1'-cyano-5'(S)-methylpiperidyl-2'(R)]-16$\alpha$-bromo-pregn-5-ene in 600 ml. of dimethylformamide at 90° C. The reaction mixture is allowed to react for 45 minutes at 90° C. and is then poured into 4 l. of water, whereupon 3$\beta$, 16$\beta$-diacetoxy-20(S)-[1'-cyano-5'(S)-methylpiperidyl-2'(R)]-pregn-5-ene is obtained in almost quantitative yield as a finely crystalline precipitate. After recrystallization from cyclohexane it possesses the following data:
Melting point:
204° to 206° C., $[\alpha]_D^{19} = -1.9°$ (CHCl$_3$)

A solution of 2 g of the 3$\beta$,16$\beta$-diacetoxy-20(S)-[1'-cyano-5'(S)-methylpiperidyl-2'(R)]-pregn-5-ene thus obtained in 100 ml. of absolute tetrahydrofuran is slowly added dropwise to a boiling solution of 2 g. of lithium alanate in 50 ml. of absolute tetrahydrofuran. The reaction is allowed to continue for 2 hours at the boiling point of the solvent, the mixture is cooled, excess lithium alanate is decomposed with a mixture of 12 ml. of water and 40 ml. of tetrahydrofuran, and the precipitate thereby produced is filtered off. The filtrate is evaporated to dryness in vacuo. 20 (S)-[5'(S)-methylpiperidyl-2'(R)]-pregn-5-ene-3$\beta$,16$\beta$-diol is obtained in practically quantitative yield as a colorless, crystalline residue. After recrystallization from benzene:
Melting point:
221° to 222° C., $[\alpha]_D^{24} = -39.7°$ (methanol)
Calculated:
C 78.04 percent, H 10.91 percent, N 3.37 percent, O 7.69 percent
Found:
C 78.1 percent, H 11.0 percent, N 3.4 percent, O 7.5 percent

EXAMPLE 3

300 mg. of 3$\beta$-acetoxy-20(S)-[1'-cyano-5'(S)-methylpiperidyl-2'(R)]-16$\alpha$-bromo-5$\alpha$-pregnane is introduced into a suspension of 150 mg. of dehydrated potassium acetate in 5.0 ml of absolute dimethylformamide at 140° C. The reaction is allowed to continue for 10 minutes at 140° C., and the mixture is cooled and extracted with benzene. The benzene solution is repeatedly washed with water, dried with sodium chloride and evaporated to dryness in vacuo. The colorless, amorphous residue of 3$\beta$,16$\beta$-diacetoxy-20(S)-[1'-cyano-5'(S)-methylpiperidyl-2'(R)]-5$\alpha$-pregnane after recrystallization from cyclohexane is identical with the product obtained according to Example 1.

The further processing to 20(S)-[5'(S)-methylpiperidyl-2'(R)]-5$\alpha$-pregnane-3$\beta$,16$\beta$-diol takes place as in Example 1.

EXAMPLE 4

210 mg. of 3$\beta$-acetoxy-20(S)-[1'-cyano-5'(S)-methyl piperidyl-2'(R)]-16$\alpha$-bromo-5$\beta$-pregnane is introduced at 150° C. into a suspension of 105 mg. of dehydrated potassium acetate and 3.5 ml of dimethylsulphoxide. After reacting for 10 minutes the reaction mixture is poured into 140 ml. of water and the 3$\beta$-16$\beta$-diacetoxy-20(S)-[1'-cyano-5'(S)- methyl-piperidyl-2'(R)]-5α-pregnane is isolated by filtration. The dried precipitate is purified by recrystallization from cyclohexane.
Melting point:
159° to 163° C.
Calculated:
C 72.96 percent, H 9.57 percent, N 5.32 percent, O 12.15 percent
Found:
C 72.7 percent, H 9.7 percent, N 5.3 percent, O 12.3 percent The further processing to give 20(S)-[5'(S)-methyl-piperidyl-2'(R)]-5α-pregnane-3β,16β-diol takes place as in Example 1.

EXAMPLE 5

150 mg. of 3β-hydroxy-20(S)-[1'-cyano-5'(S)-methyl-piperidyl-2'(R)]-16α-bromo-5α-pregnane in 15 ml. of dimethylformamide is treated with 0.5 ml. of 40 percent strength aqueous potassium acetate solution and heated to 90° C. for 45 minutes, while stirring. After cooling to room temperature, the reaction mixture is poured into 100 ml. of water. The finely crystalline precipitate of 3β-hydroxy-16β-acetoxy-20(S)-[1'-cyano-5'(S)-methyl-piperidyl-2'(R)]-5α-pregnane which hereupon separates out is filtered off, washed with water and dried.

After recrystallization from acetone-n-hexane:
Melting point:
191° to 193° C., $[\alpha]_D^{22} = +45.1°$ (chloroform).

The further processing to give 20 (S)-[5'(S)-methyl-piperidyl-2'(R)]-5α-pregnane-3β,16β-diol takes place as in Example 1.

EXAMPLE 6

210 mg. of 3β-acetoxy-20(S)-[1'-cyano-5'(S)-methyl-piperidyl-2'(R)]-16α-bromo-5α-pregnane is dissolved in 21 ml. of hexamethylphosphoric acid tris-amide and after adding 0.7 ml. of 40 percent strength aqueous potassium acetate solution the mixture is heated to 90° C. for 45 minutes. After cooling to room temperature, the reaction mixture is added dropwise to 140 ml. of water. The precipitate of 3β-16β-diacetoxy-20(S)-[1'-cyano-5'(S)-methylpiperidyl-2'(R)]-5α-pregnane which is thereby formed is filtered off, washed with water, dried and recrystallized from cyclohexane.
Melting point:
161.5° to 164.5° C.
Calculated:
C 72.96 percent, H 9.57 percent, N 5.32 percent, O 12.15 percent
Found:
C 72.8 percent, H 9.8 percent, N 5.4 percent, O 12.0 percent The further processing to give 20(S)-[5'(S)-methyl-piperidyl-2'(R)]-5α-pregnane-3β,16β-diol takes place as in Example 1.

EXAMPLE 7

A solution of 150 mg. of 3β,16β-diacetoxy-20(S)-[1'-cyano-5'(S)-methylpiperidyl-2'(R)]-pregn-5-ene, obtained according to Example 2, in 7.5 ml. of absolute tetrahydrofuran is slowly added dropwise to a boiling solution of 150 mg. of sodium alanate in 5 ml. of absolute tetrahydrofuran. After 2 hours reaction time at the boiling point of the solvent, the mixture is cooled, excess sodium alanate is decomposed with a mixture of 3 ml. of tetrahydrofuran and 1 ml. of water, and the precipitate thereby produced is filtered off. The filtrate is evaporated to dryness in vacuo. 20(S)-[5'(S)-methyl-piperidyl-2'(R)]-pregn-5-ene-3β,16β-diol is obtained in practically quantitative yield. According to a thin layer chromatogram the product is identical to the product obtained according to Example 3.

After recrystallization from benzene/n-hexane:
$[\alpha]_D^{22} = -38.0°$ (methanol).

EXAMPLE 8

250 mg. of 3β-acetoxy-20(S)-[1'-cyano-5'(S)-methyl-piperidyl-2'(R)]16α-bromo-5α-pregnane is mixed with 15 ml. of dimethylformamide and 1.94 ml of 40 percent strength aqueous sodium propionate solution and the mixture is heated to 90° C. for 4 hours. After cooling, the clear, colorless reaction solution is poured into 150 ml. of water, whereupon 3β-acetoxy-16β-propoxy-20(S)-[1'-cyano-5'(S)-methyl-piperidyl-2'(R)]-5α-pregnane is obtained as a finely crystalline precipitate in almost quantitative yield.

After recrystallization from diethyl ether it shows:
Melting point:
180° to 181° C., $[\alpha]_D^{25} = +32.2°$ (chloroform)
Analysis:
Calculated percent C = 73.30, H = 9.69, N = 5.18, O = 11.83
Found percent C = 73.3, H = 9.9, N = 5.1, O = 11.8

The further processing to 20(S)-[5'(S)-methylpiperidyl-2'(R)]-5α-Pregnane-3β,16β-diol may be carried out analogously to Example 1.

EXAMPLE 9

250 mg. of 3β-acetoxy-20(S)-[1'-cyano-5'(S)-methyl-piperidyl-2'(R)]-16α-bromo-5α-pregnane is mixed with 7.5 ml. of dimethylformamide and 1.33 ml. of 33 percent strength aqueous sodium benzoate solution and heated to 90° C. for 4 hours. After cooling, the reaction solution is poured into 75 ml. of water, whereupon 3β-acetoxy,16β-benzoxy-20(S)-[1'-cyano-5'(S)-methylpiperidyl-2'(R)]-5α-pregnane is obtained as an amorphous precipitate in almost quantitative yield. $[\alpha]_D^{25} = +35.2°$ (chloroform).

The further processing to give 20(S)-[5'(S)-methyl-piperidyl-2'(R)]-5α-pregnane-3β,16β-diol may be carried out analogously to Example 1.

What we claim is:
1. A process for the preparation of a piperidyl-steroid which has an oxygen-containing group in the 16-position, having the formula:

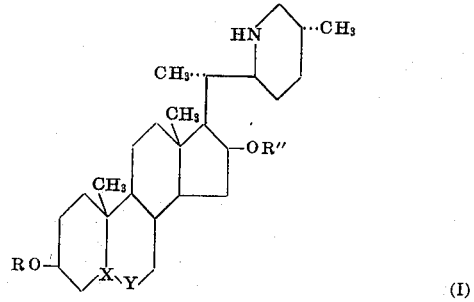

(I)

in which X-Y is selected from the group consisting of

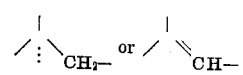

and R is selected from the group consisting of hydrogen aliphatic acyl and aromatic acyl and R" is selected from the group consisting of hydrogen, lower aliphatic acyl and benzoyl, which comprises reacting a C₁₆-bromo-cyanamide having the formula

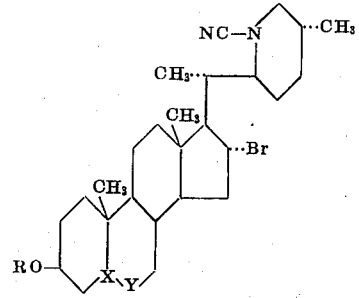

(II)

in which R and X–Y are as defined above, in a medium which is at least predominantly aprotic and polar, with a compound selected from the group consisting of alkali metal salt of a lower aliphatic carboxylic acid and alkali metal salt of benzoic acid, and after isolation of the resulting 16-acyloxycyanamide of the formula:

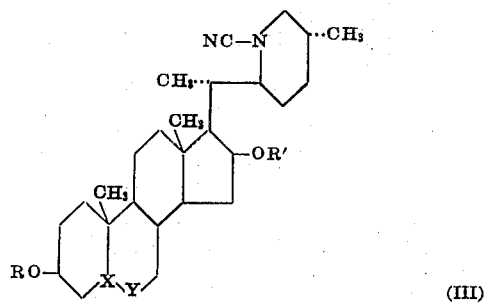

(III)

in which R' is selected from the group consisting of lower aliphatic acyl and benzoyl and R and X–Y are as defined above, reducing this compound of Formula (III) with a reducing agent selected from the group consisting of nascent hydrogen and complex hydride of aluminum in alkaline solution to remove the nitrile group.

2. A process according to claim 1, in which the reaction with the alkali metal salt is carried out in a solvent selected from the group consisting of dimethylformamide, dimethylsulphoxide, acetonitrile and hexamethylphosphoric acid trisamide.

3. A process according to claim 1, in which the alkali metal salt is employed as a concentrated aqueous solution thereof.

4. A process according to claim 1, in which the reaction with the alkali metal salt is carried out at a temperature within the range of 80° to 150° C.

5. A process according to claim 1, in which the alkali metal salt is selected from the group consisting of potassium acetate and sodium acetate.

6. A process according to claim 1, in which the 16-acyloxycyanamide derivative of Formula III is precipitated by pouring the reaction mixture from the reaction with the alkali metal salt into water and is isolated in the solid form.

7. A process according to claim 1, in which a compound selected from the group consisting of lithium aluminum hydride, sodium aluminium hydride and sodium dihydro-bis-methoxyethoxyalanate is used for the reduction of the 16-acyloxy compound of the Formula III.

* * * * *